3,702,810
PHOTOCHEMICAL METHOD FOR PREPARING
25-HYDROXYTACHYSTEROL$_3$
Hector F. De Luca and Tatsuo Suda, Madison, Wis.,
assignors to Wisconsin Alumni Research Foundation,
Madison, Wis.
No Drawing. Original application Aug. 7, 1969, Ser. No.
848,334. Divided and this application Mar. 2, 1971,
Ser. No. 120,312
Int. Cl. B01j *1/10;* C07c *169/60, 171/08*
U.S. Cl. 204—158 R                                              1 Claim

ABSTRACT OF THE DISCLOSURE

The new compounds 25 - hydroxytachysterol, 25-hydroxydihydrotachysterol$_3$ and methods for preparing same. 25-hydroxydihydrotachysterol$_3$ is characterized by antirachitic activity and by its ability to induce bone mobilization and thereby increase serum calcium concentration indicating its application for the treatment of hypoparathyroidism. 25-hydroxytachysterol$_3$ is a valuable intermediate in the preparation of 25-hydroxydihydrotachysterol$_3$.

---

This is a division of application Ser. No. 848,334, filed Aug. 7, 1969.

This invention relates primarily to a new compound characterized by antirachitic activity and by its ability to elevate serum calcium concentration in conditions of hypoparathyroidism.

More specifically this invention relates to 25-hydroxydihydrotachysterol$_3$.

In addition, this invention relates to a compound, 25-hydroxytachysterol$_3$, which is a valuable intermediate in the preparation of 25-hydroxydihydrotachysterol$_3$, and to a method for preparing such intermediate.

Dihydrotachysterol (DHT) as well as some isomers of that compound are well known and DHT$_3$ is considered an effective adjunct in the treatment of hypoparathyroidism, particularly where rapid action in elevating serum calcium concentration is being sought.

A new compound has now been found which is more effective than DHT$_3$ in promoting bone mobilization and increase in serum calcium concentration. This compound has been identified as 25 - hydroxydihydrotachysterol$_3$ (25-OH—DHT$_3$), where the subscript 3 indicates that the side chain of the molecule, attached to the nucleus at the 19-position, is the same as the side chain in vitamin D$_3$. 25-OH—DHT$_3$ also exhibits substantially greater antirachitic activity than DHT$_3$.

The physical data recited in the following discussion were obtained as follows:

Ultraviolet absorption spectra were recorded with a Model DB-G spectrophotometer manufactured by Beckman Instruments, Inc., using the extinction coefficient (in ether) indicated below:

25-hydroxy-7-dehydrochloesterol λ 282 mμ ($\epsilon$=10,920)
25-hydroxy-tachysterol$_3$ λ 281 mμ ($\epsilon$=24,600)
25-hydroxy-dihydrovitamin D$_3$-I λ 251 mμ ($\epsilon$=38,900)
25-OH—DHT$_3$ λ 251 mμ ($\epsilon$=38,900)

Nuclear magnetic resonance spectra were obtained with a Varian Associates Model HA-100 spectrometer, coupled to a time-averaging computer, using deuterio-chloroform solutions with tetramethylsilane as internal standard.

Gas-liquid partition chromatography (GLC) was performed in a Model 402 gas chromatograph manufactured by Hewlett-Packard Co. of Avondale, Pa., using 4 ft. x 0.25 in. glass columns packed with 3% W-98 on 80-100 mesh Diatoport S (a diatomaceous earth obtainable from Hewlett-Packard Co.).

High resolution mass spectra were recorded with an Associated Electrical Industries Model MD-9 or a Consolidated Electrodynamics Corporation 21–110B mass spectrometer coupled with photoplate recording.

PREPARATION OF 25-HYDROXYDIHYDRO-TACHYSTEROL$_3$

(A) General procedure

Crude diacetate of 25-hydroxy-7-dehydrocholesterol was prepared as described by Blunt and De Luca in Biochemistry 8, 671 (1969). The crude diacetate was dissolved in methanol on a hot plate. Small amounts of water were added to methanol. The diacetate of cholesta-5,7-diene-3β, 25-diol was crystallized from the methanolic solution. Contaminating 4,6-diene diacetate which showed UV absorption maximum at 239 mμ was more soluble in methanol and was removed by filtration of the crystalline 5,7-diene. The crystallization was carried out three times, and 241 mg. of diacetate of cholesta-5,7-diene-3β, 25-diol, which showed UV absorption maxima at 272, 282 and 294 mμ was isolated from the original 25-hydroxy-cholesterol acetate.

Two hundred forty-one milligrams of the diacetate of cholesta-5,7-diene, 3β, 25-diol was dissolved in 3 ml. dry ether. About 80 mg. of lithium aluminum hydride (available from Alfa Inorganics, Ventron, Beverly, Mass.) was added to the above ether solution for 5 min. After removal of ester groups through the action of the lithium aluminum hydride, 5 ml. of 1:1 (ether:ethyl acetate) solution and small amounts of distilled water were added to the reaction mixture, and this mixture was then extracted twice with ether. After the first extraction, the water phase was acidified with a few drops of 10% H$_2$SO$_4$ and extracted with ether again. The combined ether fractions were washed with 5% NaHCO$_3$ and water. The product was checked by UV spectra and GLC. 154 mg. of cholesta-5,7-diene,3β,25-diol which showed UV absorption maxima at 272, 282 and 294 mμ containing some 25-hydroxycholesterol was recovered.

(B) Synthesis of 25-hydroxytachysterol$_3$

The cholesta-5,7-diene-3β,25-diol from the above procedure was divided into two equal parts (77 mg. each). Each of these aliquots was dissolved in 400 ml. of distilled ethanol and was exposed to the radiation from a Hanovia high-pressure quartz mercury vapor lamp (Model 654A). The irradiation was carried out in a jacket around a double-walled, water-cooled, quartz immersion well and during irradiation the ethanol solution was stirred vigorously and continuously flushed with nitrogen. The lamp was ignited for two minutes before placement in the immersion well.

The first 77 mg. sample was irradiated for 2.5 minutes and the second sample for 4 minutes. The irradiated samples were then applied in a 1:1 ether/Skelly B solution (Skelly B is essentially normal hexane derived from petroleum oil, having a boiling range from about 67–68° C. marketed by Skelly Oil Co.) to a multi-bore chromatographic column (Fischer, G. A. and Kabara, J. J. (1964) Anal. Biochem. 9, 303) packed with 14 g. of heat activated silicic acid (100 mesh, from Mallinckrodt Chemical Co.). The column was eluted with a convex gradient by running 100% ethyl ether into a 250 ml. mixing chamber initially filled with a 1:1 ether:Skelly B solution. Consecutive 3 ml. fractions were collected with fraction 39–45 containing 25-hydroxytachysterol$_3$ as determined by ultraviolet analysis. 17.5 mg. and 22.0 mg. of 25-hydroxytachysterol$_3$ were obtained respectively (U.V. absorption max. at 281 mμ).

(C) Reduction of 25-hydroxytachysterol₃ to 25-OH—DHT₃

Two methods were used for the reduction of 25-hydroxytachysterol₃:

(1) Reduction by sodium-tertiary amyl alcohol.—About 1 g. of sodium metal was heated at 150° C. with 10 ml. of dry xylene in a 100 ml. of round bottom flask fitted with a tiny magnetic stirrer and reflux condenser using a nitrogen atmosphere with exclusion of moisture. 17 mg. of 25-hydroxytachysterol₃ including 25-hydroxycholesterol was dissolved in 10 ml. of dry xylene and added to the above sodium-xylene mixture with a 3 ml. xylene rinse. In the course of 15 min. with vigorous stirring, a mixture of 5 ml. dry t-amyl alcohol and 3 ml. of dry xylene was added, followed by the addition of 13 ml. of t-amyl alcohol. After this, stirring was continued at 150° C. for 75 min. The mixture was then cooled and the excess of sodium removed with 100% ethanol. After evaporation of xylene, the residue was extracted twice with ether. The ethereal solution was washed with water three times, dried with anhydrous $Na_2SO_4$ and then evaporated. The residue, when dissolved in ether, showed UV absorption maxima at 242.5, 251 and 260.5 m$\mu$ and also at 272, 282 and 294 m$\mu$ suggesting the presence of some 25-hydroxy-7-dehydrocholesterol. This mixture was applied to a multi-bore silicic acid column (see Blunt and De Luca (1969), Biochemistry, 8, 671) and the column was eluted with an ether/Skelly B gradient obtained by running 100% ether into a 250 ml. mixing chamber initially filled 1:1 (ether: Skelly B). Consecutive five ml. fractions were collected.

Ultraviolet analysis indicated the presence of 3 mg. of 25-OH—DHT₃ in fractions 14–26, while later fractions contained 25-hydroxy-7-dehydrocholesterol. Gas-liquid partition chromatography showed, however, the presence of 25-hydroxydihydrovitamin D₃-I and 25-hydroxy-7-dehydrocholesterol. 3 mg. of 25-hydroxydihydrotachysterol₃ containing 25-hydroxydihydrovitamin D₃-I and 25-hydroxy-7-dehydrocholesterol were applied to a partition column, constructed as follows. Twenty grams of Celite (a diatomaceous silica product marketed by Johns-Mansville Co.) were mixed with 15 ml. of a stationary phase (80% methanol-20% water, equilibrated with an equal volume of Skelly B), and packed in a 1 cm. diameter column. The column was eluted with mobile phase (Skelly B equilibrated with methanol-water), with 5 ml. fractions being collected. 25-hydroxy-dihydrovitamin D₃-I was eluted in fractions 11–16, 25-OH—DHT₃ was eluted in fractions 13–20 and 25-hydroxy-7-dehydrocholesterol in fractions 17–21.

(2) Reduction by lithium-ammonia.—About 25 ml. dry ammonia gas was condensed in a round-bottom flask fitted with a stirrer, dropping funnel, inlet and outlet tube, and protected from moisture with sodalime. The flask was cooled by means of an isopropyl alcohol-Dry Ice mixture. Ten ml. of dry distilled ether was added. A small amount of lithium was added until a lasting blue coloration of the mixture indicated the absence of moisture. The mixture was stirred and approximately 100 mg. of lithium was dissolved in the mixture in the course of 15 min. at −50 to −60° C. 22 mg. of 25-hydroxytachysterol₃ in 10 ml. of dry distilled ether was added to the reaction mixture. After another 5 min. of stirring, the excess of lithium was removed by adding 1 g. of solid ammonium chloride, which discolored the solution. After careful dilution with water, extraction with ether three times and then washing the ethereal solution with water three times, the extract showed UV absorption maxima at 242.5, 251 and 260.5 m$\mu$. 1.4 mg. of crude

25-OH—DHT₃ was obtained.

This crude 25-OH—DHT₃ was applied to a multi-bore silicic acid column as described above and consecutive 5 ml. fractions were collected. 0.9 mg. of 25-OH—DHT₃ was eluted only in fractions 20–34. Gas-liquid partition chromatographic analysis showed this 25-OH—DHT₃ contained some 25-hydroxy-7-dehydrocholesterol, but no 25-hydroxy-dihydrovitamin D₃-I or II. After application of the combined fractions on a Celite partition column as described above, 528 $\mu$g. of pure 25-OH—DHT₃ (as shown by GLC was obtained.

IDENTIFICATION

The identity of the 25-hydroxydihydrotachysterol₃, obtained in pure form by the two methods outlined above, was verified as follows.

The ultraviolet spectra is identical with that of dihydrotachysterol₃ i.e. $\lambda$ maxima at 242.5, 251, and 260.5 m$\mu$. The high resolution mass spectra of dihydrotachysterol₃ and of 25-hydroxydihydrotachysterol₃ also exhibit a very similar pattern. The molecular ion of the latter occurs at m/e 402.3506 ($C_{27}H_{46}O_2$, calc. 402.3498) in agreement with the structural assignment. Both spectra show the fragmentation sequence typical for the vitamin D series, namely M-sidechain-$H_2O$, resulting in the ions at 273 and 255. A less common fragmentation-loss of ring A and C-6–C-7—is likewise observed for both compounds—yielding in the case of dihydrotachysterol the peak at m/e 247, and in the case of its 25-hydroxy derivatives the peaks at m/e 263 and 245. The peak at m/e 259 occurring in both spectra appears to involve fragmentation of both the sidechain and of ring A; a plausible explanation is given by the sequence: M→301→259, i.e. the elimination of a six carbon fragment from the sidechain to yield an ion of composition $C_{21}H_{33}O$ (301.3598) followed by loss of ketene involving the hydroxyl function of ring A. Difference between the two spectra concern primarily the appearance of a peak at m/e 59 ($C_3H_7O$) due to the 25-hydroxy grouping, the more pronounced loss of the elements of $H_2O$ (m/e 384) from the molecular ion, and the enhancement of the peak at m/e 120 ($C_9H_{12}$–120.0922).

N.M.R. spectra also demonstrated the expected side chain structure as compared to DHT₃. Especially evident was the 1.2 p.p.m. singlet from the 26, 27 methyl protons, the 0.90 p.p.m. doublet (J=8 cps.) from the $C_{21}$ protons and the 0.54 p.p.m. singlet from the $C_{18}$ protons. (In the case of the DHT₃ a singlet at 0.54 p.p.m. doublets from the $C_{26,27}$ methyl protons at 0.87 p.p.m. (J.=5 cps.) and a doublet from the $C_{21}$ methyl protons at 0.93 p.p.m. (J=5 cps.) was observed.) Thus the structure was confirmed as 25-OH—DHT₃.

BIOLOGICAL ACTIVITY OF 25-OH—DHT₃

Hypoparathyroidism

Seventy-one male rats, five weeks old and weighing 120–130 g. each, were maintained on the low calcium diet described by De Luca et al., J. Nutrition, 75, 175 (1961) for seven days after which 1% calcium gluconate in 2.5% glucose (weight basis) was substituted for the drinking water and twenty-four hours later the rats were thyroparathyroidectomized surgically. The 1% calcium gluconate solution was continued for 48 hours postoperatively and then 0.45% sodium chloride in 2.5% glucose was substitued for it. All rats were given 75 I.U. of vitamin D₃ every three days until they were killed. Three days following the surgery the surviving rate were bled from the tail for a determination of serum calcium. Animals with a serum calcium concentration below 7.0 mg./100 ml. were considered to be parathyroidectomized.

Six of the thirty-nine surviving rats exhibited serum calcium concentrations from 7.9–10.1 mg./100 ml. and were considered therefore to have functioning parathyroids which had not been removed surgically. These rats were used as operated thyroidectomized controls.

The thirty-three rats considered parathyroidectomized were divided into seven groups. The rats in each of several groups were given, by stomach tube, a single dose of varying amounts of $DHT_3$ or 25-OH—$DHT_3$ dissolved in 0.1 ml. of Wesson oil (a commercially available vegetable oil marketed by the Wesson Co.) while the control group and a group of parathyroidectomized rats were given only oil. Twenty-four hours after dosing the rats were bled for determination of serum calcium. The assays were carried out in accordance with the procedure of Harrison et al., Proc. Third Parathyroid Conf. Excerpta Med. Int. Cong., Ser. No. 159, p. 455(1968) with the results indicated in the table below.

TABLE I

| Rats | Group, dose | Amount | Before dose | 24 hrs. after dose |
|---|---|---|---|---|
| Surgical control. | Oil | 0.1 ml | 9.3±0.80(6) | 9.8±0.76(6) |
| TPTX[2] | Oil | 0.1 ml | 5.9±0.35(4) | 5.5±0.76(4) |
| TPTX | $DHT_3$ | 50 μg | 5.3±0.75(4) | 6.3±0.75(4) |
| TPTX | $DHT_3$ | 100 μg | 5.7±0.45(6) | 7.5±0.36(6) |
| TPTX | 25-OH—$DHT_3$ | 100 μg | 5.5±0.33(6) | 6.0±0.49(6) |
| TPTX | 25-OH—$DHT_3$ | 25 μg | 5.5±0.36(6) | 6.7±0.75(6) |
| TPTX | 25-OH—$DMT_3$ | 50 μg | 5.4±0.67(4) | 7.7±0.70(4) |
| TPTX | 25-OH—dihydrovitamin-$D_3$-I. | 100 μg | 5.6±0.17(3) | 5.2±0.20(3) |

[1] Number of rats in each group in parentheses.
[2] TPTX indicates thyroparathyroidectomized rats.

It is evident from the foregoing table that

25-OH—$DHT_3$ is much more effective than $DHT_3$ in elevating serum calcium in surgical hypoparathyroid rats. As little as 10 μg. of 25-OH—$DHT_3$ gave some elevation while 50 μg. was more effective than 100 μg. of $DHT_3$.

The 25-hydroxydihydrovitamin $D_3$-I, an isomer isolated from the sodium and t-amyl alcohol reduction process described above was found inactive even at 100 μg.

Calcium transport by everted intestinal sacs

The thyroparathyroidectomized animals were also assayed in accordance with the procedures outlined in Blunt et al., Proc. Acad. Sci., 61, 1503 (1968) to determined their intestinal calcium transport characteristics. The calcium transport is expressed as a ratio of $^{45}Ca$ (serosal side)/$^{45}Ca$ (mucosal side).

TABLE II

| Rats | Group, dose | Amount | No. of rats in group | Transport ratio (avg.) |
|---|---|---|---|---|
| Surgical control | Oil | 0.1 ml | 3 | [1] 5.4±0.6 |
| TPTX[2] control | Oil | 0.1 ml | 4 | 3.7±0.7 |
| TPTX[2] | $DHT_3$ | 100 μg | 6 | 5.8±0.6 |
| TPTX | 25-OH—$DHT_3$ | 10 μg | 6 | 4.3±0.7 |
| TPTX | 25-OH—$DHT_3$ | 25 μg | 6 | 5.6±0.8 |
| TPTX | 25-OH—$DHT_3$ | 50 μg | 4 | 5.7±1.2 |

[1] Standard deviation. [2] Thyroparathroidectomized.

It is evident from the foregoing table that only about one-half as much 25-OH—$DHT_3$ as $DHT_3$ is required to achieve equivalent intestinal calcium transport in thyroparathyroidectomized rats.

Serum calcium response (bone mobilization)

Male weanling rats were fed the diet described in De Luca et al., J. Nutr., 75, 175 (1961) for 14 days except that the calcium was eliminated from the diet. The rats were then dosed intrajugularly with 2.5 μg. of 25-OH—$DHT_3$ or $DHT_3$ each in 0.02 ml. of ethanol. The controls received ethanol only. Serum was collected from the animals at the times indicated in the table below and assayed for calcium by the method of Webster, Am. J. Clin. Pathol., 131, 330 (1960) with results shown.

TABLE III

| Hours after administration | No. of rats | Serum calcium, mg. percent | |
|---|---|---|---|
| | | 25-OH—$DHT_3$ | $DHT_3$ |
| 0 (control) | 9 | [1] 4.5±0.25 | |
| 6 | 4 | 5.1±0.30 | 5.0±0.15 |
| 12 | 5 | 6.0±0.35 | 4.9±0.25 |
| 24 | 5 | 6.5±0.30 | 5.7±0.20 |

[1] Standard deviation.

It is evident from the above data that 25-OH—$DHT_3$ acts more rapidly and is more effective in inducing bone mobilization than is $DHT_3$.

Antirachitic activity (line test assay)

Weanling rats were fed the rachitogenic diet described in U.S. Pharmacopeia 14th Revision, Easton, Pa., Mack Publishing Co., p. 889 (1955). After a 21 day depletion period a single dose of either $DHT_2$. $DHT_3$ or 25-OH—$DHT_3$ was administered. Seven days later the rats were killed and the line test was performed on sectioned radii and ulnae of individual rats. The biological activity was ascertained as described in U.S. Pharmacopeia, 15th Revision, Easton, Pa., Mack Publishing Co. (1955). Results are indicated in the table below.

TABLE IV

| Dose | No. of rats | Activity, IU/μg. |
|---|---|---|
| $DHT_2$ | 8 | 0.09 |
| $DHT_3$ | 8 | 0.16 |
| 25-OH—$DHT_3$ | 8 | 0.80 |

It is evident from the above tabulation that 25-OH—$DHT_3$ exhibits five times the antirachitic activity of $DHT_3$ and almost ten times that of $DHT_2$ (dihydrotachysterol where the side chain at the -19 position in the nucleus is the same as that in vitamin $D_2$). The application of 25-OH—$DHT_3$ as a supplementary antirachitic agent in poultry and animal feeds is clearly suggested.

It is also evident that 25-OH—$DHT_3$ is a powerful inducer of bone mobilization where there is a vitamin D deficiency. It does not, however, have the calcification properties of the D vitamins. This combination of characteristics and the experimental data set forth herein indicates that it is an ideal agent for use as a bone mobilizer or to elevate serum calcium concentration in cases of hypoparathyroidism or other bone diseases.

Having thus described the invention what is claimed is:

1. The method for preparing 25-hydroxytachysterol$_3$ which comprises: irradiating a solution of cholesta-5,7-diene - 3β,25 - diol with ultraviolet and chromatographically recovering the 25-hydroxytachysterol$_3$ from the irradiated product.

References Cited

UNITED STATES PATENTS 3,338,891    8/1967    Wechter ———————— 204—158

HOWARD S. WILLIAMS, Primary Examiner

U.S. Cl. X.R.

260—397.2